(12) United States Patent
Takahashi

(10) Patent No.: US 8,537,317 B2
(45) Date of Patent: Sep. 17, 2013

(54) MULTI-DOMAIN VERTICAL ALIGNMENT LIQUID CRYSTAL DISPLAY COMPRISING SLANTING SLITS EXTENDING ALONG DIAGONALS OF A PLURALITY OF PIXEL ELECTRODES WHEREIN THE SLANTING SLITS HAVE A LENGTH OF ⅓ THE TOTAL LENGTH OF THE DIAGONALS OF THE PIXEL ELECTRODES

(75) Inventor: Satoru Takahashi, Hyogo (JP)

(73) Assignee: Innolux Corporation, Chu-Nan (TW)

( * ) Notice: Subject to any disclaimer, the term of this patent is extended or adjusted under 35 U.S.C. 154(b) by 337 days.

(21) Appl. No.: 12/855,202

(22) Filed: Aug. 12, 2010

(65) Prior Publication Data

US 2011/0037932 A1 Feb. 17, 2011

Related U.S. Application Data

(60) Provisional application No. 61/234,331, filed on Aug. 17, 2009.

(51) Int. Cl.
*G02F 1/1337* (2006.01)
*G02F 1/1343* (2006.01)

(52) U.S. Cl.
USPC .......................... 349/130; 349/142

(58) Field of Classification Search
USPC ............................ 349/48, 130, 136, 142–144
See application file for complete search history.

(56) References Cited

U.S. PATENT DOCUMENTS

| 2005/0253797 A1 | 11/2005 | Kamada et al. |
| 2008/0284953 A1 | 11/2008 | Takahashi |
| 2010/0053518 A1* | 3/2010 | Jeong et al. ................. 349/114 |

FOREIGN PATENT DOCUMENTS

| CN | 101308291 A | 11/2008 |
| WO | 2009044582 A1 | 4/2009 |

OTHER PUBLICATIONS

"High-Definition MVA-Premium Liquid Crystal Display", FIND, vol. 19, No. 5, 2001.

* cited by examiner

*Primary Examiner* — Paul Lee
(74) *Attorney, Agent, or Firm* — Kirton McConkie; Evan R. Witt

(57) ABSTRACT

In a multi-domain vertical alignment liquid crystal display, a pixel electrode, a common electrode and liquid crystal molecules are combined to form an LC alignment unit. In the LC alignment unit, at least two slits crossing each other at one point are created in the common electrode; and slanting slits are created in the pixel electrode, extending along diagonals of the pixel electrode. The slits in the common electrode and the slits in the pixel electrode stagger from one another.

13 Claims, 6 Drawing Sheets

MULTI-DOMAIN VERTICAL ALIGNMENT LIQUID CRYSTAL DISPLAY COMPRISING SLANTING SLITS EXTENDING ALONG DIAGONALS OF A PLURALITY OF PIXEL ELECTRODES WHEREIN THE SLANTING SLITS HAVE A LENGTH OF ⅓ THE TOTAL LENGTH OF THE DIAGONALS OF THE PIXEL ELECTRODES

CROSS REFERENCE TO RELATED PATENT APPLICATION

This patent application is based on a U.S. provisional patent application No. 61/234,331 filed Aug. 17, 2009.

FIELD OF THE INVENTION

The present invention relates to a liquid crystal display and an LC-aligning method of the same. The present invention more particularly relates to a multi-domain vertical alignment liquid crystal display (MVA-LCD) and an LC-aligning method of the same.

BACKGROUND OF THE INVENTION

Liquid crystal displays have now surpassed conventional CRT units and become a main stream in the market due to its compact appearance, energy-efficient feature, improved image quality and a wide range of applications.

FIG. 1 schematically shows components of a display area of an LCD panel. In the display area 212, matrices of pixel electrodes 221, thin film transistors (TFT) 222, gate lines 223 and data lines 224 are formed on a lower glass substrate 211. Above the pixel electrodes 221, an alignment film 225 is provided. Oppositely, on almost the entire surface of an upper glass substrate 231 facing to the lower glass substrate 211, a common electrode 233 and an alignment film 232 are formed. Furthermore, a liquid crystal (LC) layer 241 is sealed in the space between the lower alignment film 225 and the upper alignment film 232.

With the alignment films 225 and 232, liquid crystal molecules in the LC layer 241 are specifically and differentially oriented. The orientation of the alignment films is determined depending on the type of the LCD, and varies with the structures and/or material of the alignment films. For example, liquid crystal molecules arrange themselves twisted, e.g. in a helical structure, in a twisted nematic (TN) LCD before an electric field is applied. On the other hand, in a vertical alignment (VA) LCD, liquid crystal molecules naturally arrange themselves vertically. When no voltage is applied, the liquid crystal molecules of a VA LCD remain perpendicular to the substrate so as to render a black display. When a voltage is applied, the liquid crystal molecules change toward a horizontal direction, i.e. a direction parallel to the substrate, thereby allowing light to pass through and creating a white display.

As known, a VA LCD has good contrast when viewed vertically. However, image quality would be adversely affected if viewed at a relatively large viewing angle. FIG. 2 illustrates viewing conditions of a VA LCD at different view positions. As shown, when liquid crystal molecules 33 tilt in response to a voltage, a gray color can be seen at a viewing position A right in front of the display. However, at viewing positions B and C, black and white colors are seen, respectively, due to different tilting angles of liquid crystal molecules 33 relative to different viewing positions. As a result, the displaying is distorted.

For remedying the defect, a multi-domain vertical alignment (MVA) LCD is developed, as illustrated in FIG. 3. As shown, a pixel is divided into a plurality of domains and liquid crystal molecules 33 are oriented differently in different domains, e.g. tilting counterclockwise in the left portion 31 and tilting clockwise in the right portion 32 of the pixel. Accordingly, under the similar condition of the grey color as illustrated in FIG. 2, the left portion 31 of the pixel is shown black while the right portion 32 of the pixel is shown white at the viewing position C. On the other hand, at the viewing position B, the left portion 31 of the pixel is shown white while the right portion 32 of the pixel is shown black. Therefore, the pixel is shown substantially even grey at arbitrary viewing positions. Generally, four domains are proper for wide angle viewing.

However, it is difficult in practice to divide a single pixel which has a size as small as 100×300 μm into four domains and control the liquid crystal molecules in the four domains to be oriented differentially. For facilitating differential orientation of liquid crystal molecules in different domains, a bump structure is provided either between the pixel electrode and its associated alignment film or the common electrode and its associated alignment film or both for automatic domain formation. Please refer to FIG. 4, which illustrates the principle of automatic domain formation with an example.

As shown in the example of FIG. 4, a bump structure 41 is formed between the pixel electrode 40 and the lower alignment film 42 at a boundary 43 of domains. Due to the presence of the bump structure 41, some of the liquid crystal molecules 44 distributed above the bump structure 41 and supposed to stand vertically when no voltage is applied tilt. Then the tilting action propagates as indicated by arrows so that the liquid crystal molecules in the same domain are oriented consistently. Since the configuration of the bump structure makes the liquid crystal molecules distributed above the bump structure 41 tilt in different directions, the liquid crystal molecules in different domains are oriented differentially.

Alternatively or additionally, the bump structure 41 may be provided between the upper alignment film 45 and the common electrode 46.

Although differential orientation of liquid crystal molecules in multi-domains can be achieved by way of bump structures as described above, the formation of the bump structure complicates the manufacturing process of the LCD panel. Therefore, slits are created in either the pixel electrode 50 or the common electrode 52 to replace the bump structure 41 to achieve the object of differential orientation of liquid crystal molecules, as illustrated in FIG. 5A or FIG. 5B. The slits 51 are arranged in the pixel electrode 50 or the common electrode 52. The shape of the slits 51 may be a circle or a "+" cross when viewed from top. In general, the use of the cross-shaped slits results in better transmittance than the use of circular slits. It is to be noted that for neat drawing, alignment films are not particularly shown in the figures.

However, due to the cross-shaped configuration of the slits, it takes a long response time to reach stable LC alignment since complicated movement of liquid crystal molecules is involved, including directing liquid crystal molecules 61a disposed above the slit 60 to a right angle, then directing liquid crystal molecules 61b near the slit 60 to rotate to an oblique angle and then expanding other liquid crystal molecules 61c to the oblique angle, as illustrated in FIG. 6A-6C.

SUMMARY OF THE INVENTION

Therefore, the present invention provides a MVA-LCD with slits, exhibiting improved transmittance and response time at the same time.

The present invention provides a multi-domain vertical alignment liquid crystal display, which comprises a first substrate and a second substrate disposed opposite to each other and having a space therebetween; a matrix of pixel electrodes formed on the first substrate, facing the second substrate, and including a plurality of alignment slits; a common electrode formed on the second substrate, facing the first substrate, and including a plurality of alignment slits; and liquid crystal molecules disposed in the space, each of which has an orientation varying with an electric field applied between the pixel electrodes and the common electrode and a position thereof relative to the alignment slits of the pixel electrodes and the common electrode; wherein the alignment slits of at least one of the pixel electrodes and the common electrode include at least two crossing slits having an included angle less than 90 degrees.

The present invention also provides a multi-domain vertical alignment liquid crystal display, comprising: a first substrate and a second substrate disposed opposite to each other and having a space therebetween; a matrix of pixel electrodes formed on the first substrate, facing the second substrate, and including a plurality of alignment slits; a common electrode formed on the second substrate, facing the first substrate, and including a plurality of alignment slits; and liquid crystal molecules disposed in the space, each of which has an orientation varying with an electric field applied between the pixel electrodes and the common electrode and a position thereof relative to the alignment slits of the pixel electrodes and the common electrode; wherein the alignment slits of at least one of the pixel electrodes and the common electrode include at least one slanting slit extending along a diagonal of the corresponding electrode.

The present invention further provides an LC-aligning method for use in a multi-domain vertical alignment liquid crystal display, wherein the multi-domain vertical alignment liquid crystal display comprises a pixel electrode, a common electrode and liquid crystal molecules forming an LC alignment unit, and the method comprises: creating at least two slits crossing each other at one point in the common electrode; and creating slanting slits in the pixel electrode, extending along diagonals of the pixel electrode; wherein the slits in the common electrode and the slits in the pixel electrode stagger from one another.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

In order to improve transmittance and response time of a MVA-LCD with slits, the slit configuration is particularly designed according to the present invention. The slit configuration to be designed includes shape, size and position of the slit, an aperture ratio of the pixel with the slit, etc., which affects performance of the display in a variety of ways.

Figure 1:
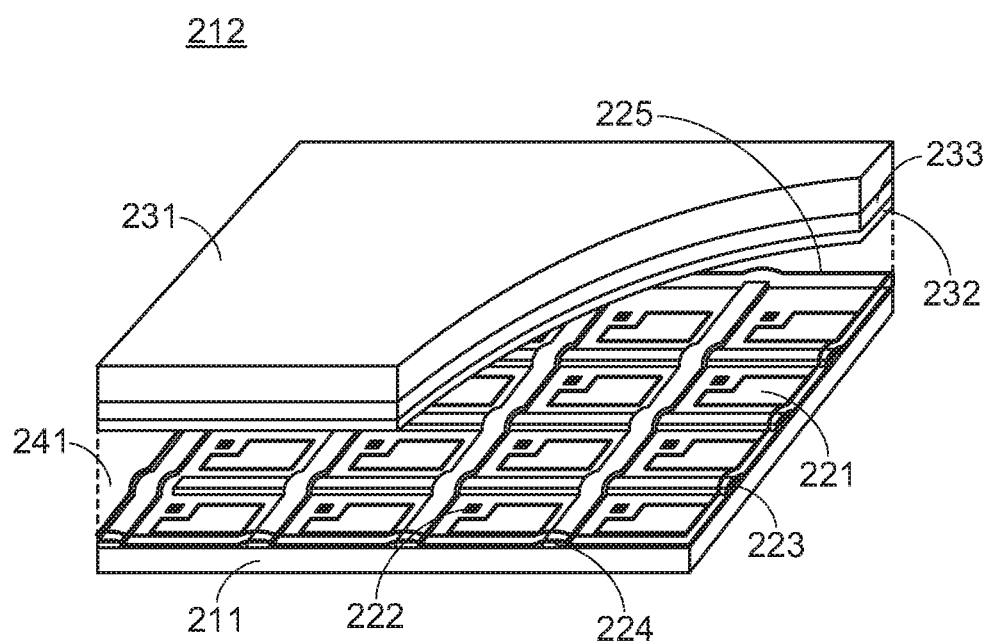
FIG. 1 is a schematic diagram illustrating components of a display area of an LCD panel.
Figure 2:
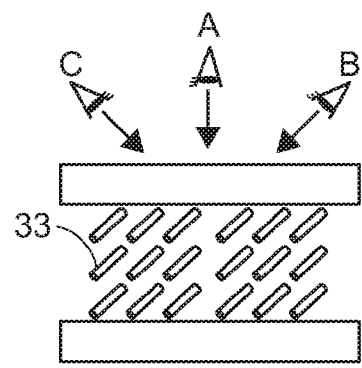
FIG. 2 is a schematic diagram illustrating viewing conditions of a VA LCD at different view positions.
Figure 3:
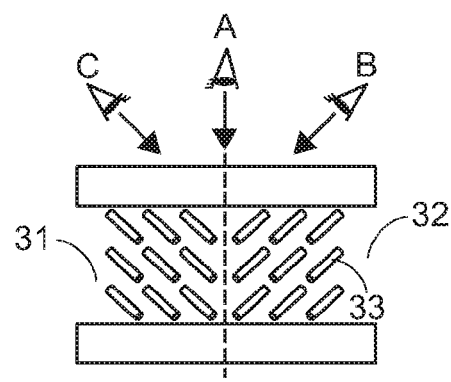
FIG. 3 is a schematic diagram illustrating viewing conditions of a MVA LCD at different view positions.
Figure 4:
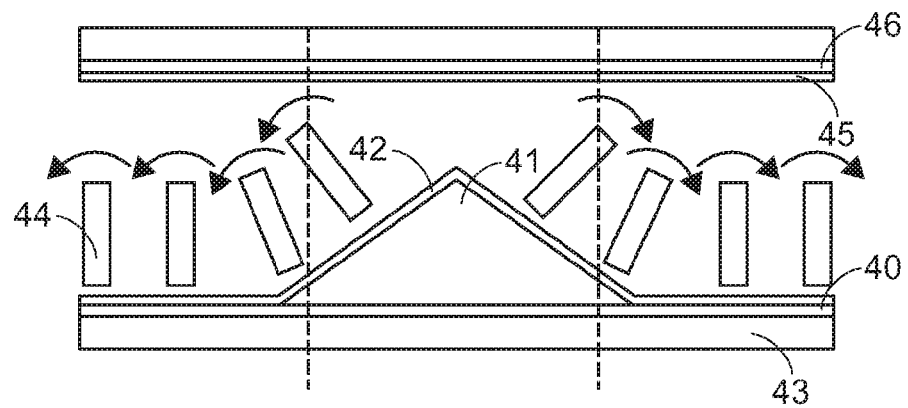
FIG. 4 is a schematic diagram illustrating the principle of automatic domain formation with an example.
Figure 5A:
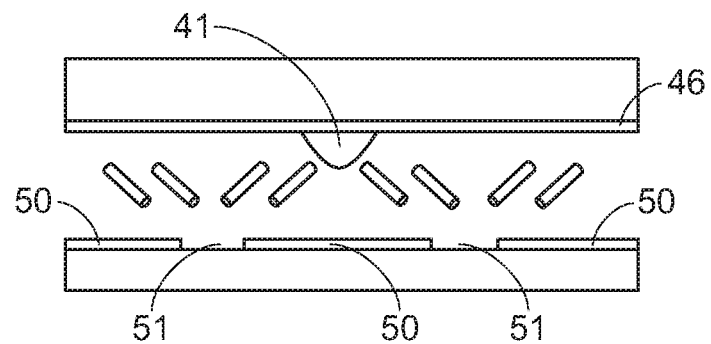
FIG. 5A is a schematic diagram illustrating the principle of another automatic domain formation with an example.
Figure 5B:
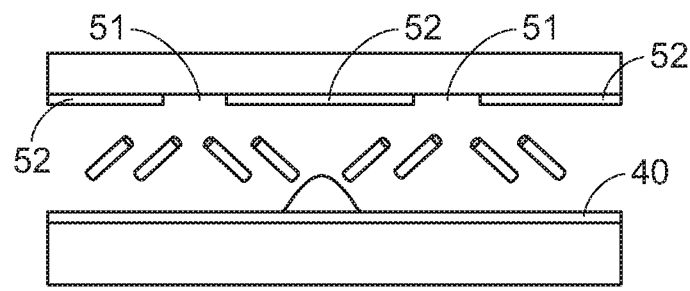
FIG. 5B is a schematic diagram illustrating the principle of a further automatic domain formation with an example.
Figure 6A:
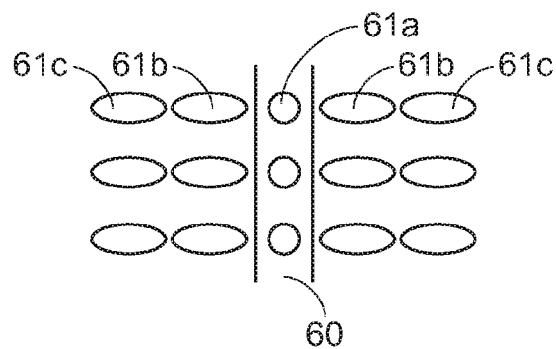
FIG. 6A through 6C are schematic diagrams illustrating the LC moving process before reaching stable LC alignment.
Figure 6B:
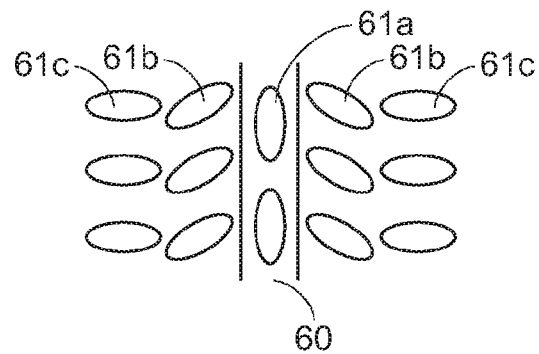
Figure 6C:
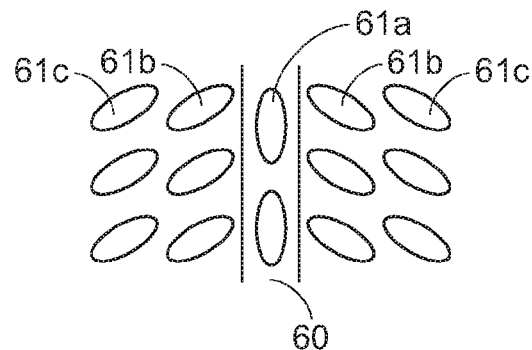
Figure 7A:
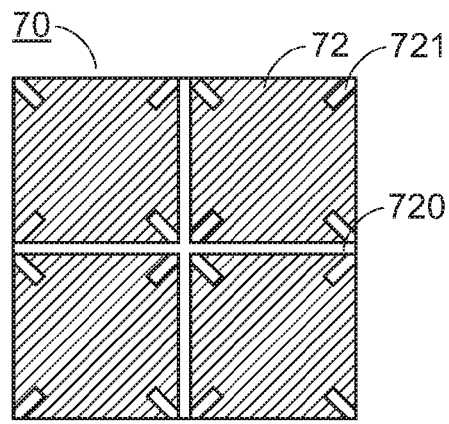
FIG. 7A is a schematic diagram illustrating a slit configuration in a pixel electrode according to an embodiment of the present invention.
Figure 7B:
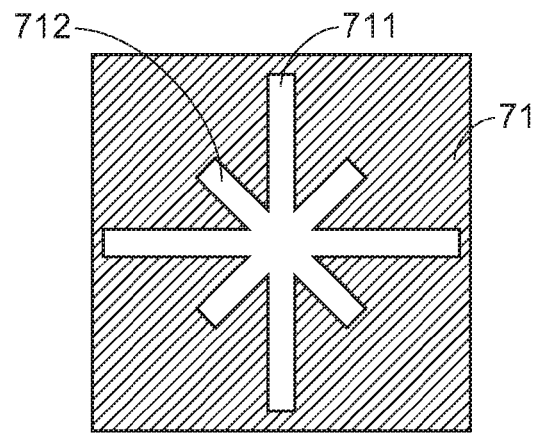
FIG. 7B is a schematic diagram illustrating a slit configuration in a common electrode according to an embodiment of the present invention.
Figure 8:
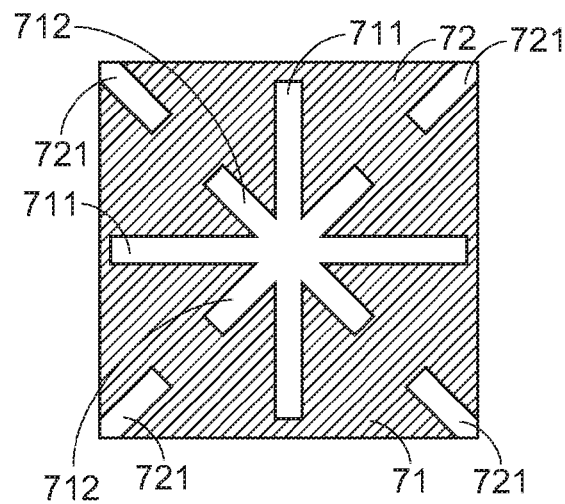
FIG. 8 is a schematic diagram illustrating a slit configuration in an LC alignment unit with overlapping common and pixel electrodes according to an embodiment of the present invention.

Please refer to FIGS. 7A and 7B which illustrate slit configurations of a MVA-LCD according to an embodiment of the present invention. The LCD is exemplified to have a structure similar to that shown in FIG. 1. The slits are distributed in both common electrode 71 and pixel electrodes 70. In this embodiment, each pixel is divided into a plurality of sub-pixels, e.g. four sub-pixels, by dividing each pixel electrode 70 into four sub-pixel electrodes 72 with slits 720, as shown in FIG. 7A. In each sub-pixel electrode 72, slits 721 are formed. On the other hand, as shown in FIG. 7B, slits 711 and 712 are formed in the common electrode 71. It is to be noted that only one set of slits 711 and 712 is shown as one LC alignment unit is shown herein, but there could be a plurality of sets of slits 711 and 712 formed in the common electrode 71. FIG. 8 further illustrates relative configurations and positions of slits in an LC alignment unit in the view of overlapping common electrode 71 and sub-pixel electrode 72, wherein the slits 711/712 and 721 do not overlap with each another.

It is not to be limited but it is preferred that each of the sub-pixel electrodes 72 has a substantially square shape, which is beneficial to fast response. In each LC alignment unit, a slit with a "+" cross shape 711 plus a "x" cross shape 712 is formed on the common electrode 71 of the MVA-LCD at a position opposite to a center of the sub-pixel electrode 72. It is not to be limited but it is preferred that the slits 711 and 712 are centrally positioned for relatively fast response. Furthermore, four slanting slits 721 are formed at corners of the sub-pixel electrode 72, as illustrated in FIG. 7. It is not to be limited but it is preferred that the number of slanting slits 721 is four since higher slit number, although resulting in fast response, would sacrifice transmittance. Both the slanting slit portions 712 on the common electrode 71 and the slanting corner slits 721 on the sub-pixel electrode 72 extend along diagonals of the sub-pixel electrode 72, while staggering with each other. It is also possible to use the corner slits 721 together with just the "+" cross slit 711 without the "x" cross slit 712 or use the corner slits 721 together with just the "x" cross slit 712 without the "+" cross slit 711 to improve transmittance and response speed, but the response speed might not be as fast as the use of the corner slits 721 together with both the "+" cross slit 711 and the "x" cross slit 712. However, modification or variation could be made based on the above descriptions in order to improve response speed.

On the common electrode side 71, the width of the "+"-shaped slit portion 711 and the width of the "x"-shaped slit portion 712 are substantially equal, and substantially equal to the width of the slanting slits 721 and the pixel-dividing slits 720 on the sub-pixel electrode 72 side in view of balancing effect. The length of each of the two slanting slit portions 712 is about ⅓ of the diagonal distance of the sub-pixel area, penetrating through the center of the mark "+". On the other hand, each of the slanting slits 721 extending along one of the diagonals on the sub-pixel electrode 72 side also has a length about ⅓ of the diagonal distance from a corner of the sub-pixel electrode 72 to a position opposite to the center of the "+"-shaped slit portion 711 on the common electrode 71. It is not to be limited but it is preferred to design the pixel and common electrodes with the length of the slits as described above in view of balance between transmittance and response time. Smaller length of slits, e.g. ¼ the diagonal distance, is advantageous in high transmittance but results in slower response compared to the length of ⅓ the diagonal distance. Larger length of slits, e.g. ½ the diagonal distance, has comparable response time with the length of ⅓ the diagonal distance, but results in lower transmittance.

Preferably, the ratio of the width of the slit to the cell gap (the thickness of the liquid crystal layer) is particularly designed in order to improve liquid crystal alignment. The optimal ratio will be described with reference to FIG. 9 and FIG. 10.

Figure 9:
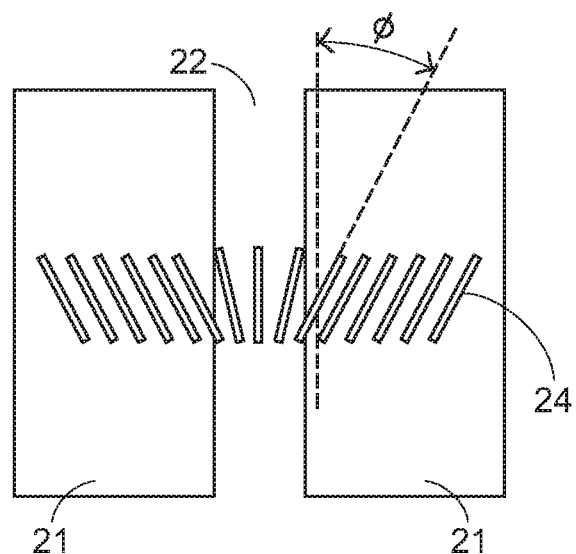
FIG. 9 is schematic diagram illustrating an azimuth angle ($\Phi$) of liquid crystal molecules around a slit, which correlates to the width of the slit.
Figure 10:
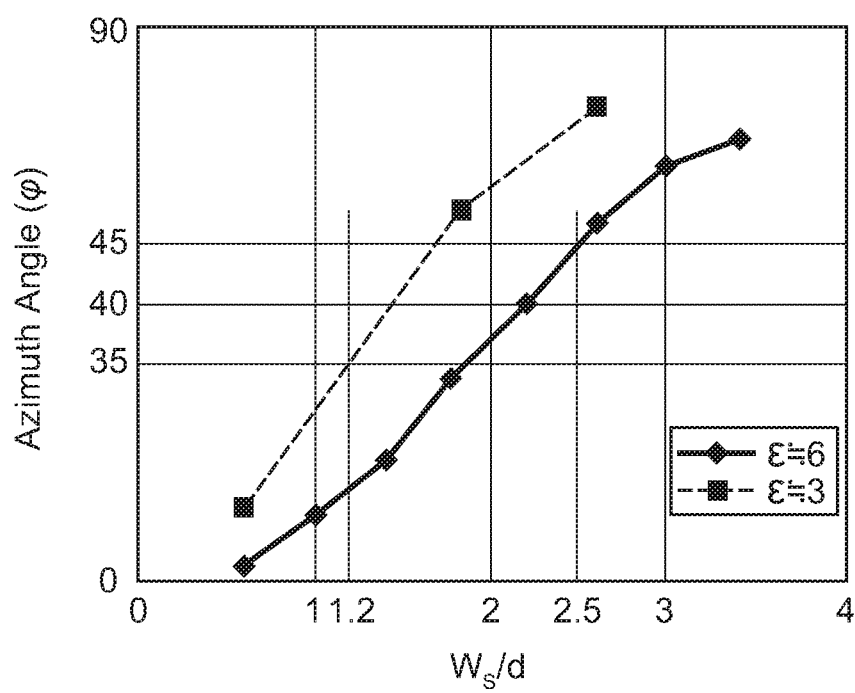
FIG. 10 is a plot showing a correlation of an azimuth angle to a ratio of slit width to cell gap (Ws/d; horizontal axis).

As shown in FIG. 9, when a slit 22 is disposed in an electrode 21, the liquid crystal molecules 24 near the center of the slit commonly incline with the presence of the slit. As the width of the slit decreases, an azimuth angle ($\Phi$) of a liquid crystal molecule is correspondingly reduced. The azimuth angle ($\Phi$) of the liquid crystal molecules around the slit correlates to the width of the slit. Simulations under relative permittivity ($\epsilon$) 3 and 6 are performed, and the correlation of the azimuth angle to the ratio of the width of the slit to the cell gap (Ws/d; horizontal axis) is shown in FIG. 10. As shown, the value of Ws/d ranged from at least 1.0 to 3.0 widens the azimuth angle of the liquid crystal molecule. More specifically, it is preferable that the value of Ws/d ranges from 1.2 to 2.5 for the liquid crystal molecule to have an azimuth angle of 45±10 degrees in view of fast response.

Furthermore, it is preferred that when a linear polarizer plate is used, the orientation of the "+"-shaped slit is consistent to an absorbing axis of the polarizer plate. It is also preferable that the length and the width of the sub-pixel are ranged from 30 μm to 70 μm in view of balance between transmittance and response time. If the size of an LC alignment unit, i.e. a sub-pixel, is too small, transmittance decreases. On the other hand, response time increases with the increase of the size of the LC alignment unit.

With the slit configuration described above, optional transmission and response time of a MVA-LCD can be achieved.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A multi-domain vertical alignment liquid crystal display, comprising:
a first substrate and a second substrate disposed opposite to each other and having a space therebetween;
a matrix of pixel electrodes formed on the first substrate, facing the second substrate, and including a plurality of alignment slits;
a common electrode formed on the second substrate, facing the first substrate, and including a plurality of alignment slits; and
liquid crystal molecules disposed in the space, each of which has an orientation varying with an electric field applied between the pixel electrodes and the common electrode and a position thereof relative to the alignment slits of the pixel electrodes and the common electrode;
wherein the alignment slits of at least one of the pixel electrodes and the common electrode include at least two crossing slits having an included angle less than 90 degrees, at least one of the pixel electrodes is defined with a plurality of sub-pixel electrodes, each of which constitute an LC alignment unit along with the common electrode, each of the sub-pixels has slanting slits serving as some of the alignment slits, which are provided at corners thereof, each of the slanting slits extends along diagonals of the sub-pixel electrode, the slanting slits extending along a diagonal of the sub-pixel electrode has a total length equal to substantially ⅓ the total length of the diagonal of the sub-pixel electrode.

2. The multi-domain vertical alignment liquid crystal display according to claim 1 wherein the alignment slits of both the pixel electrodes and the common electrode include at least two crossing slits having an included angle less than 90 degrees.

3. The multi-domain vertical alignment liquid crystal display according to claim 1 wherein the pixel electrode is divided into four sub-pixel electrodes by two crossing dividing slits which serves as some of the alignment slits.

4. The multi-domain vertical alignment liquid crystal display according to claim 3 wherein each of the sub-pixel electrodes has a length and a width ranged from 30 μm to 70 μm, respectively.

5. The multi-domain vertical alignment liquid crystal display according to claim 3 wherein each of the sub-pixel electrodes has a square shape.

6. The multi-domain vertical alignment liquid crystal display according to claim 1 wherein the alignment slits of the common electrode include at least two crossing slits having an included angle less than 90 degrees, and the at least two crossing slits are disposed opposite to a center of one of the sub-pixel electrode.

7. The multi-domain vertical alignment liquid crystal display according to claim 1 wherein a ratio of a width of the alignment slits to a cell gap of the LC alignment units is ranged between 1.2 to 2.5.

8. The multi-domain vertical alignment liquid crystal display according to claim 1 wherein the alignment slits of the pixel electrodes and the alignment slits of the common electrode do not overlap with one another.

9. The multi-domain vertical alignment liquid crystal display according to claim 1 wherein all the alignment slits are the same in width.

10. The multi-domain vertical alignment liquid crystal display according to claim 1 wherein the alignment slits of the pixel electrodes or the common electrode include at least two crossing slits having an included angle of 45 degrees.

11. The multi-domain vertical alignment liquid crystal display according to claim 1 wherein the alignment slits of the pixel electrodes or the common electrode include at least four slits crossing at one point.

12. A multi-domain vertical alignment liquid crystal display, comprising:

a first substrate and a second substrate disposed opposite to each other and having a space therebetween;

a matrix of pixel electrodes formed on the first substrate, facing the second substrate, and including a plurality of alignment slits;

a common electrode formed on the second substrate, facing the first substrate, and including a plurality of alignment slits; and liquid crystal molecules disposed in the space, each of which has an orientation varying with an electric field applied between the pixel electrodes and the common electrode and a position thereof relative to the alignment slits of the pixel electrodes and the common electrode;

wherein the alignment slits of at least one of the pixel electrodes and the common electrode include at least one slanting slit extending along a diagonal of the corresponding electrode, the alignment slits of the pixel electrodes include slanting slits extending along diagonals of the pixel electrodes and having a total length equal to substantially ⅓ the total length of the diagonals of the pixel electrodes, wherein the alignment slits of the common electrode include a "+"-shaped slit and a "x"-shaped slit crossing each other at one point.

13. An LC-aligning method for use in a multi-domain vertical alignment liquid crystal display, the multi-domain vertical alignment liquid crystal display comprising a pixel electrode, a common electrode and liquid crystal molecules forming an LC alignment unit, and the method comprising:

creating at least two slits crossing each other at one point in the common electrode, wherein the at least two slits include a "+"-shaped slit and a "x"-shaped slit crossing each other at the one point; and creating slanting slits in the pixel electrode, extending along diagonals of the pixel electrode;

wherein the slits in the common electrode and the slanting slits in the pixel electrode stagger from one another, the slanting slits have a total length equal to substantially ⅓ the total length of the diagonals of the pixel electrode.

* * * * *